June 5, 1951     O. GREENE     2,555,741
COLLAPSIBLE MEASURING RULE
Filed June 23, 1950
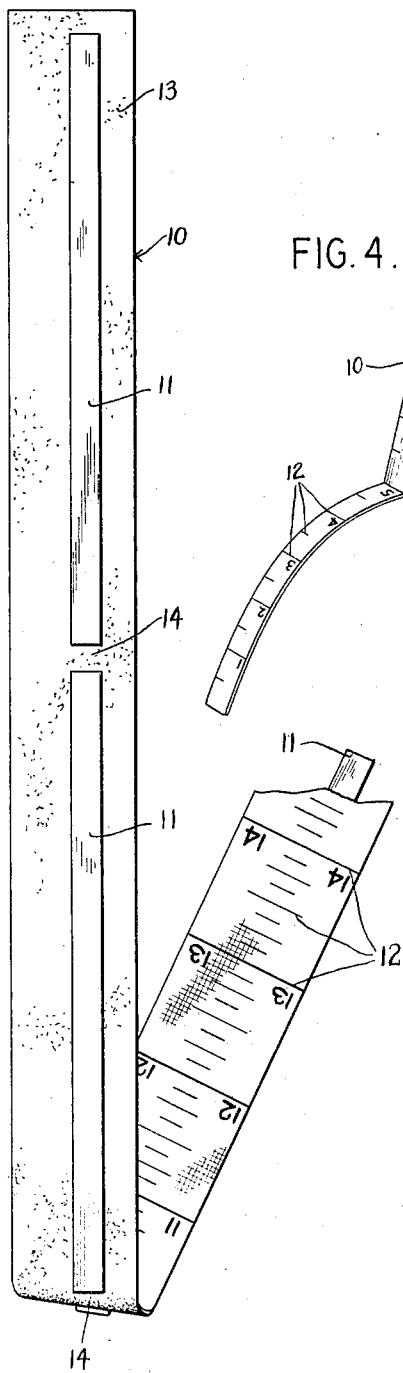
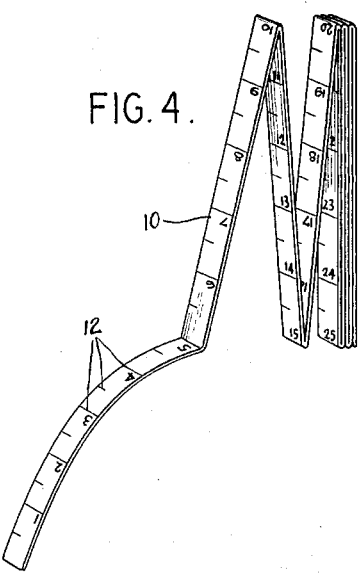
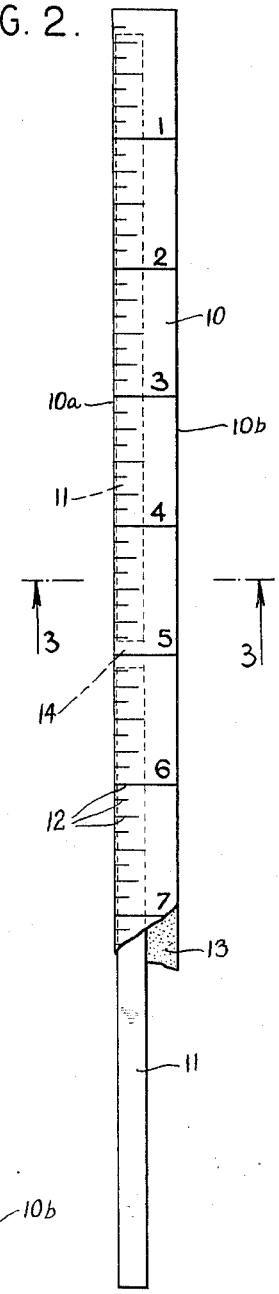
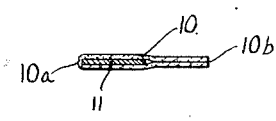
INVENTOR
OSCAR GREENE
BY Mock & Blum
ATTORNEYS Patented June 5, 1951

2,555,741

UNITED STATES PATENT OFFICE 2,555,741

COLLAPSIBLE MEASURING RULE

Oscar Greene, New York, N. Y.

Application June 23, 1950, Serial No. 169,920

5 Claims. (Cl. 33—137)

My invention relates to improvements in measuring devices, and has particular relation to a collapsible ruler.

It is an object of the invention to provide a collapsible ruler having a covering made of fabric material and containing stiffening inserts rigidly secured at spaced intervals between said covering, so that the ruler may be folded to a compact or portable size.

Another object of the invention is the provision of a ruler of the character described which is resilient and bendable so that it may be used in the manner of measuring tape. The conventional measuring tape in use today is wound into roll form and generally stored in a drawer. In storage, the tape has a tendency to become unwound and to twist and become knotted, so that it is difficult to use for measurement. In addition, the tape tends to become tangled with thread, scissors, or other objects in the drawer, so that it is usually not in a usable condition when needed. The stiffening inserts contained in the ruler of my invention prevent the body of said ruler from becoming knotted or creased, and from becoming tangled with other objects so that it is constantly handy and available for effective use.

Still another object of the invention is the provision of a ruler of the type described which may be used in the manner of a folding or collapsible carpenter's rule, as for instance to measure a straight edge. The ruler of my invention is, however, light and compact in its folded or collapsed form, so that it may be conveniently carried about in the pocket or purse.

A further object of the invention is the provision of a ruler of the character described which is extremely economical and convenient to manufacture.

Additional objects and advantages of the invention will be readily apparent in the course of the following specification and claims when taken in connection with the accompanying drawings, in which:

Fig. 1 is an inside plan view of a section of the ruler before the same is folded into final assembled form, with a portion of the ruler bent upwardly to reveal the outer surface thereof;

Fig. 2 is a front plan view of a portion of the assembled ruler with a portion thereof broken away to reveal the inner construction thereof;

Fig. 3 is a sectional view taken along line 3—3 of Fig. 2; and

Fig. 4 is a perspective view of the complete ruler in a partially folded or collapsed position.

Referring in detail to the drawings, the measuring rule is made essentially of a fabric cover 10 and a series of stiffening ribs or inserts 11.

The cover 10 is made of an elongated, narrow, strip of material which may be any strong fabric material such as that used in the manufacture of conventional measuring tapes. As shown in Fig. 1, an inch scale 12, or any other suitable scale is printed upon one surface of the cover 10. The other surface may bear a coating of adhesive 13. I prefer to print the lines of the scale 12 completely across the width of the cover 10, so that when said cover is folded in half along a longitudinal fold line, the scale is presented on both outer surfaces of the folded rule. Scale numerals may be associated with appropriate lines of the scale 12 in the usual manner, said numerals reading consecutively in the same direction as shown in Fig. 1, or reading in opposite directions as is the customary practice today in the manufacture of measuring tapes.

The adhesive coating 13 may be a thermoplastic adhesive which can be applied at any time during the manufacture of the cover 10. With the use of this material, the cover 10 is folded on its longitudinal axis with the stiffening inserts 11 placed in position, and the cover 10 is then heat-pressed so that the thermoplastic material cements the inner surfaces of the cover 10 to each other to provide the finished, assembled rule. Optionally, any other suitable type of adhesive may be used to cement the inner surfaces of cover 10.

The stiffening inserts 11 are made of a normally stiff but easily bendable material such as thin spring steel or other suitable metal, or a suitable resilient plastic. The inserts 11 are made in the form of elongated, narrow, thin, strips which have a normal flat and planar shape. These inserts 11 may be bent when desired, but because of their resiliency will retake their normal flat shape when the bending force is removed.

The inserts 11 are made of a uniform and equal length and width. Said inserts 11 are substantially narrower than the cover 10, preferably having a width about one-quarter the width of said cover 10.

In assembling the rule, the inserts 11 are placed flat upon the coated side of the cover 10 adjacent the center of said cover 10, and in longitudinal, spaced alinement, as shown in Fig. 1. The cover 10 is then folded in half on its central longitudinal axis, as shown in Fig. 2 to provide a folded cover edge 10a and an open edge 10b, The inner surfaces of the cover 10 are then secured together in flush abutment by means of the adhesive coating 13, to form the completed ruler which has a cover of double thickness which contains the inserts 11.

I prefer to make the cover 10 approximately one inch wide and the inserts 11 approximately one-quarter inch wide. When the inserts 11 are placed in position adjacent the center of cover 10, and said cover is folded in half edge-wise, there is approximately one-quarter inch of cover material beyond the inserts 11 adjacent the unfolded or free edge 10b of said cover 10, as is clearly shown in Fig. 2. The inner surfaces of this free material are cemented together, and the remainder of the cover 10 is cemented to the surfaces of the strips 11. Said strips 11 are thus sealed in position in the assembled rule, so that they are immovable relative to the cover 10.

The cover 10 may be made of any desired length, although I prefer to make it in a sixty inch length, as is customary with conventional measuring tapes. The stiffening inserts 11 may also be made of any desired length, so long as these lengths are uniform. The inserts 11 may be made, for example, in slightly less than five or six inch lengths, so that the folded or collapsed ruler will be small enough to be conveniently carried about in the pocket or purse.

Each insert 11 is spaced a small longitudinal distance from the adjacent inserts to provide a gap or space 14 between each said insert. These gaps 14 are preferably made as small as possible, for example about one-sixteenth of an inch, to prevent the material of cover 10 from over-riding or over-lapping at said gaps 14. The assembled rule may be folded transversely at each of said gaps 14 in alternately opposite directions when the rule is brought to its collapsed position, as shown in Fig. 4.

The stiffening inserts 11 may be secured within the rule adjacent the folded edge 10a of cover 10, to provide a relatively stiff longitudinal edge of the assembled rule. Alternatively, the inserts 11 may be centered within the assembled rule so that both longitudinal edges thereof may be relatively soft, and the rule may be carried about in comfort. It should be noted that the assembled rule provides two unobstructed longitudinal measuring edges.

In use the rule may be unfolded to the degree desired, and the unfolded sections laid straight for measurement of a straight line or surface. The rule will lie flat and substantially straight due to the stiffening inserts 11 and the small size of the gaps 14 between said inserts 11. In addition, the rule may be held vertical and will assume a planar and straight form in this position.

The rule may also be used in the manner of measuring tape to measure an arcuate, rounded, or irregular surface or object since the resilience of the inserts 11 permit any portion of the rule to be bent to conform to such shapes, as is indicated in Fig. 1.

As was previously indicated, the inner surfaces of the cover 10 are preferably cemented together to form the assembled rule. Although cementing is probably the most economical and most feasible method of manufacturing the rule, it is obvious that equivalent means of assembling the rule may be used, such as riveting the cover 10 in closed position with the inserts 11 secured in place, or stitching the open longitudinal edges 10b of the cover 10, and providing transverse rows of stitching at the gaps 14 to hold the inserts 11 in assembled spaced position.

While a preferred embodiment of the invention has been shown and described herein, it is obvious that numerous additions, changes, and omissions may be made in the invention without departing from the spirit and scope thereof.

I claim:

1. A measuring rule comprising a fabric covering having scale indicia on its outer surface, and a plurality of thin, flat stiffening ribs secured within said fabric covering in longitudinal alinement, said stiffening ribs being spaced longitudinally a short distance from each other and being of equal size, said stiffening ribs also being normally planar, and being bendable from their normal shape.

2. A measuring rule comprising a covering of elongated, narrow fabric material folded upon itself along a central longitudinal fold line to provide a pair of fold sections, said fold sections being secured together in flush relation to each other, and a plurality of thin flat stiffening ribs secured between said fold sections, said stiffening ribs being disposed in longitudinal spaced alinement and being of uniform length, said stiffening ribs also being normally flat and planar, and being bendable and resilient.

3. A measuring rule comprising a covering of elongated narrow fabric material folded upon itself along a central longitudinal fold line to provide two equal halves, said fold sections being secured together in flush relation to each other, and a plurality of thin flat stiffening ribs secured between said covering halves, said stiffening ribs being disposed in longitudinal spaced alinement and being of uniform length, said stiffening ribs being normally straight, planar, and resilient and being bendable out of their normal flat shape, the resilience of said ribs being sufficient to return said ribs from their bent shape to their normal flat and planar shape, the distance between said stiffening ribs being sufficient to enable said ruler to be folded into collapsed form between said stiffening ribs.

4. A measuring rule according to claim 3 in which the outer surfaces of said covering are provided with measuring scale indicia and in which the inner surfaces of said covering are cemented to each other and to said stiffening ribs.

5. A measuring rule according to claim 4 in which said stiffening ribs are positioned adjacent the longitudinal folded edge of said covering, said stiffening ribs being substantially narrower than said folded covering.

OSCAR GREENE.

No references cited.